United States Patent
Shin

(10) Patent No.: US 6,739,969 B2
(45) Date of Patent: May 25, 2004

(54) AIR VENT PROVIDED WITH A COVER

(75) Inventor: Kwang-Seob Shin, Kyunggi-do (KR)

(73) Assignee: Yundai Mobis, Co., Ltd., Yongin (KR)

( * ) Notice: Subject to any disclaimer, the term of this patent is extended or adjusted under 35 U.S.C. 154(b) by 0 days.

(21) Appl. No.: 10/324,026

(22) Filed: Dec. 20, 2002

(65) Prior Publication Data

US 2004/0005854 A1 Jan. 8, 2004

(30) Foreign Application Priority Data

Jul. 2, 2002 (KR) ................ 10-2002-0037914
Jul. 2, 2002 (KR) ................ 10-2002-0037913

(51) Int. Cl.[7] ................................ B60H 1/34
(52) U.S. Cl. ....................... 454/155; 454/324
(58) Field of Search ..................... 454/152, 155, 454/322, 324

(56) References Cited

U.S. PATENT DOCUMENTS

| | | | | |
|---|---|---|---|---|
| 3,646,877 A | * | 3/1972 | Ellis | 454/322 |
| 4,517,809 A | * | 5/1985 | Hoyt | 62/183 |
| 4,887,520 A | * | 12/1989 | Bauer | 454/155 |
| 5,188,561 A | * | 2/1993 | Nissimoff et al. | 454/256 |
| 6,146,265 A | * | 11/2000 | Greenwald | 454/155 |
| 6,224,480 B1 | * | 5/2001 | Le et al. | 454/160 |
| 6,394,891 B1 | * | 5/2002 | Arold | 454/155 |
| 6,554,696 B2 | * | 4/2003 | Kowalski et al. | 454/155 |

\* cited by examiner

*Primary Examiner*—Jiping Lu
(74) *Attorney, Agent, or Firm*—Greenblum & Bernstein, P.L.C.

(57) ABSTRACT

Disclosed is an air vent including a duct for inducing air to the interior of an automobile and a grill disposed at the end of the duct, which comprises guides disposed at both sides of the grill; a cover equipped with a rack gear on its inner surface, which is lifted by the guides; a pinion gear engaged with the rack gear; a motor for rotating the pinion gear; and a switch part manipulated by a user to open and close the cover. By the cover, it can prevent foreign substances from entering the inside of the air vent and provide a favorable appearance.

4 Claims, 5 Drawing Sheets

[FIG. 1]
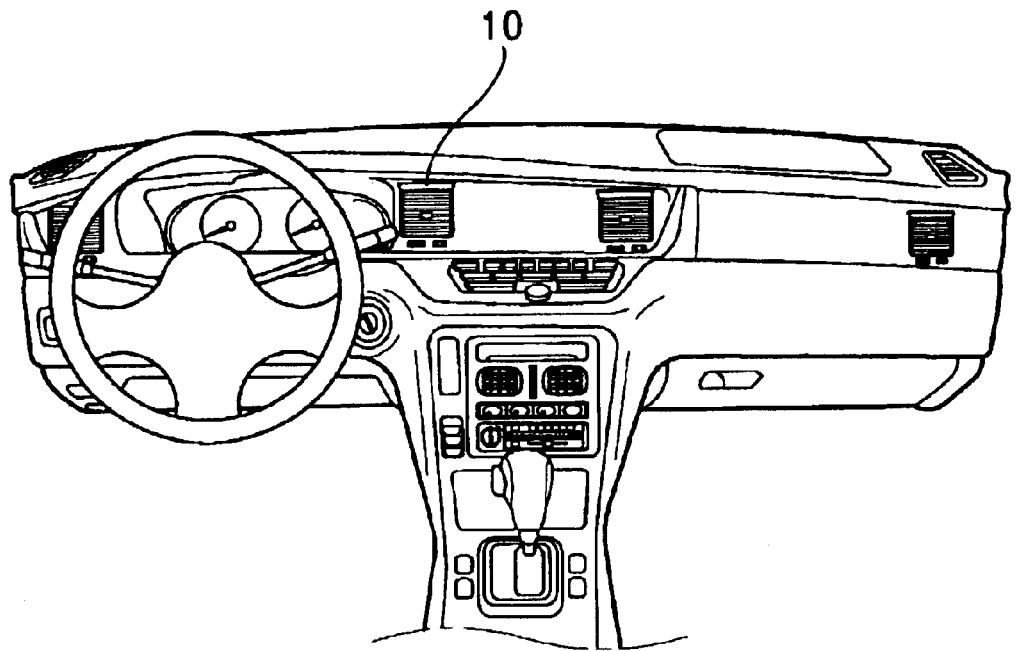
[FIG. 2]
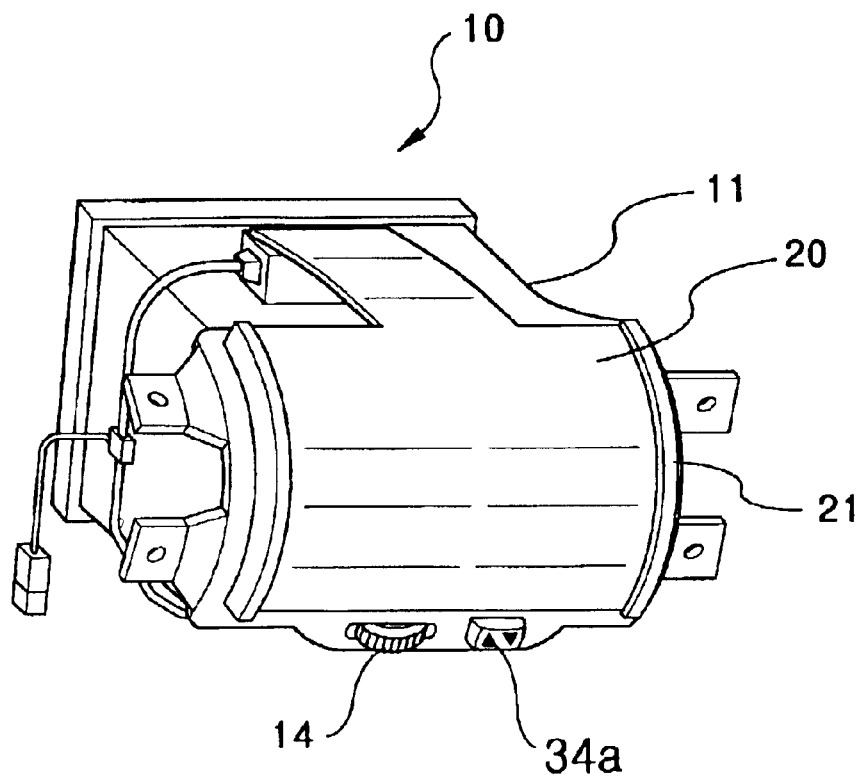

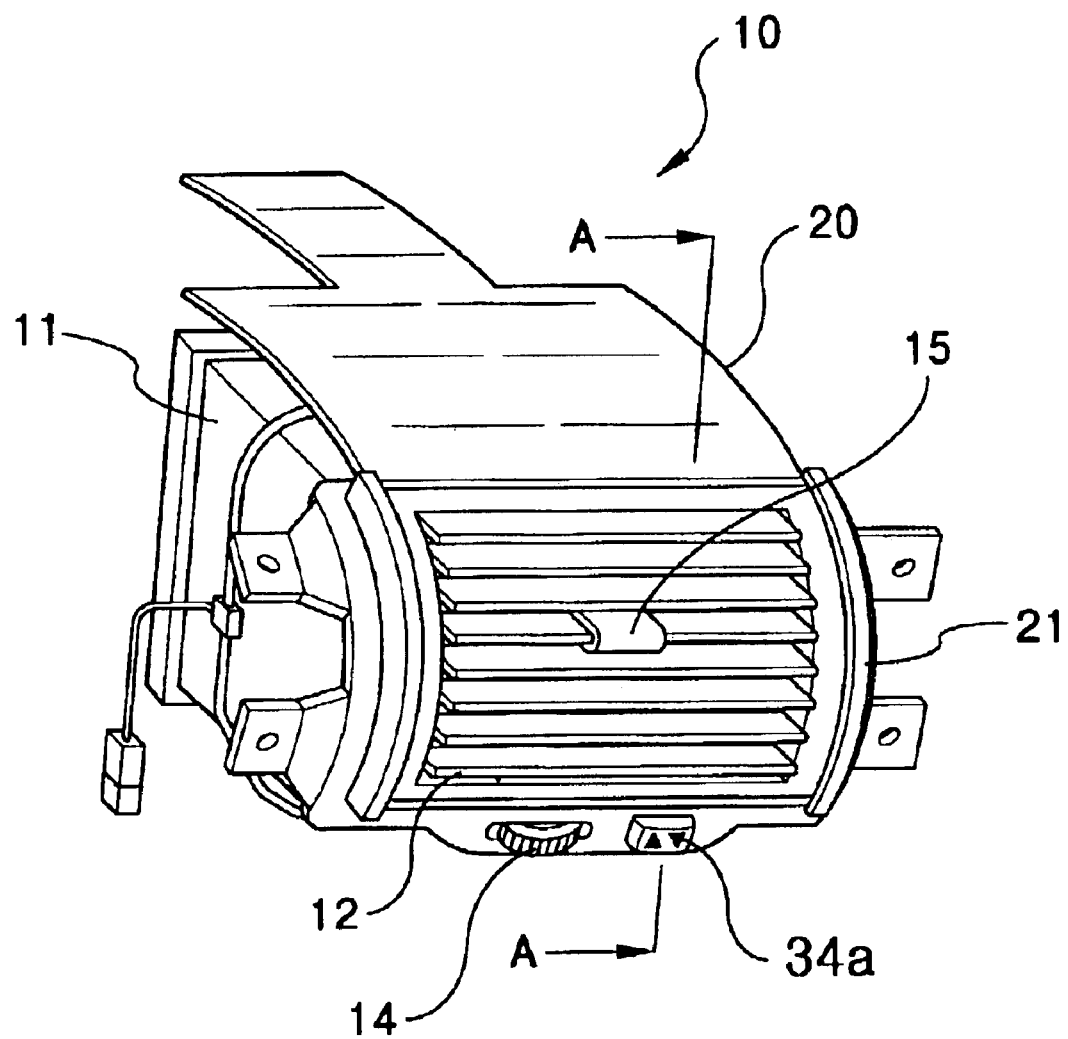
[FIG. 3]

[FIG. 4]
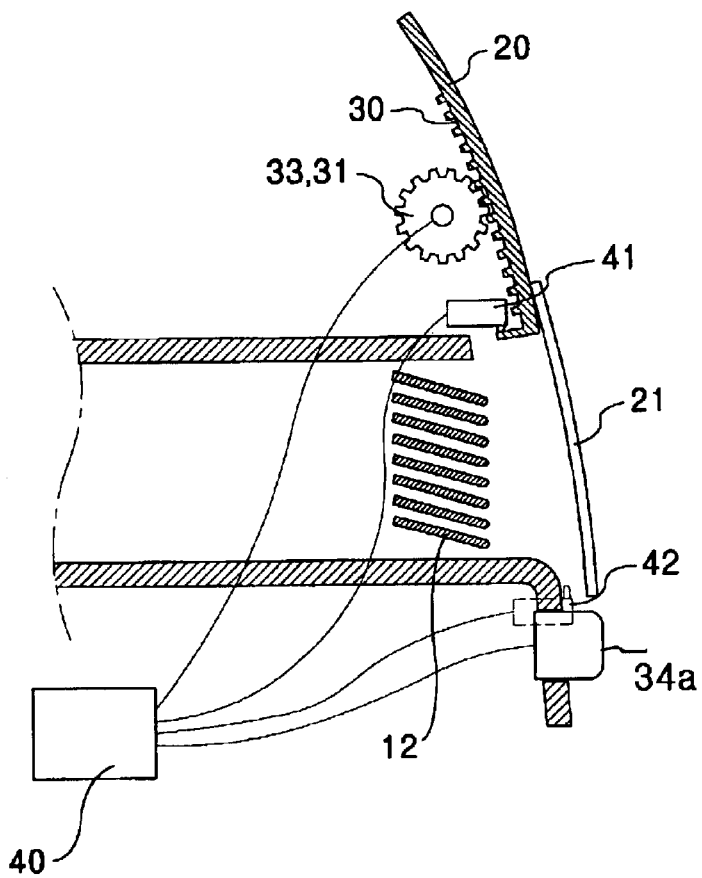
[FIG. 5]
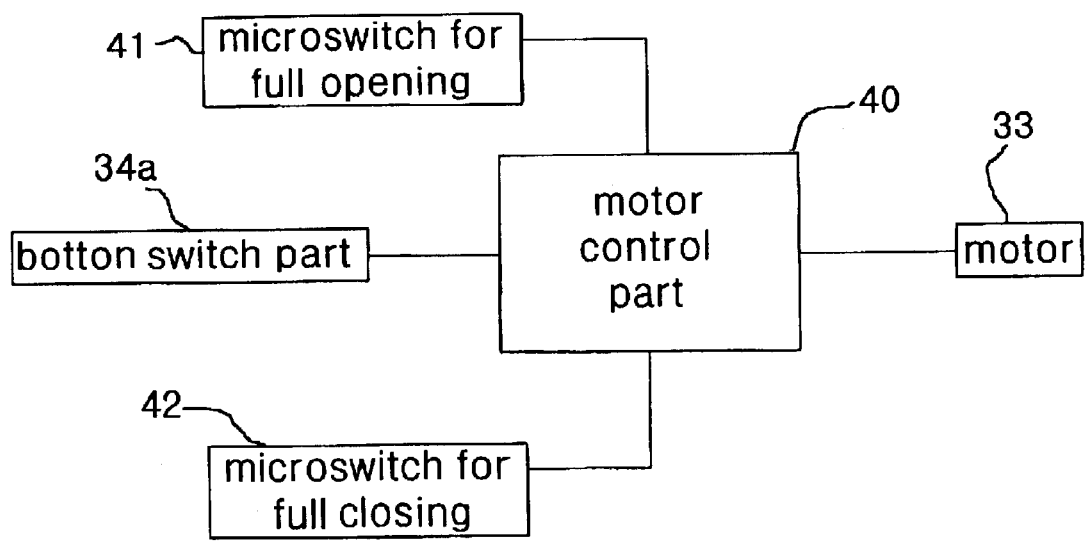

[FIG. 6]
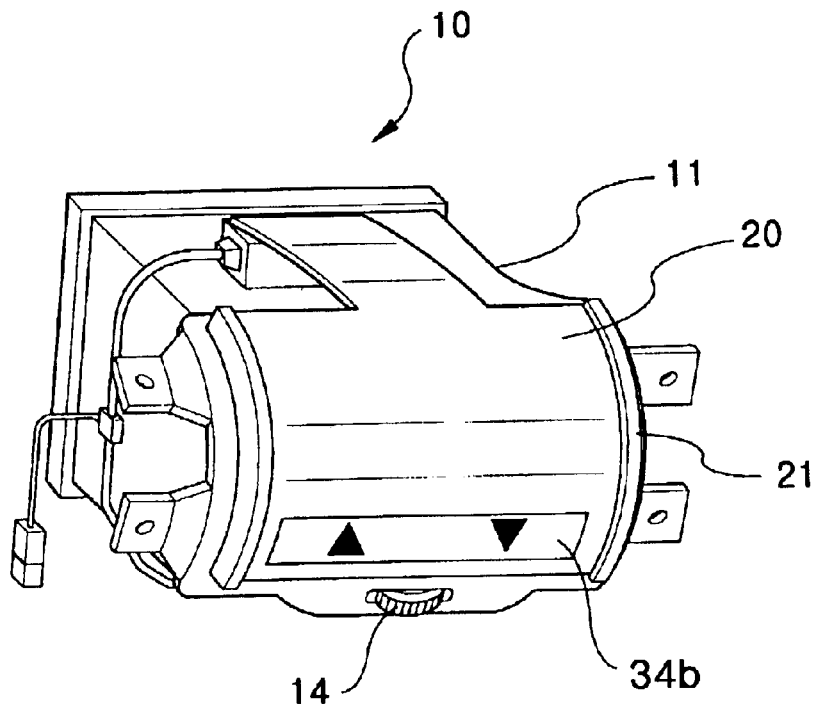
[FIG. 7]
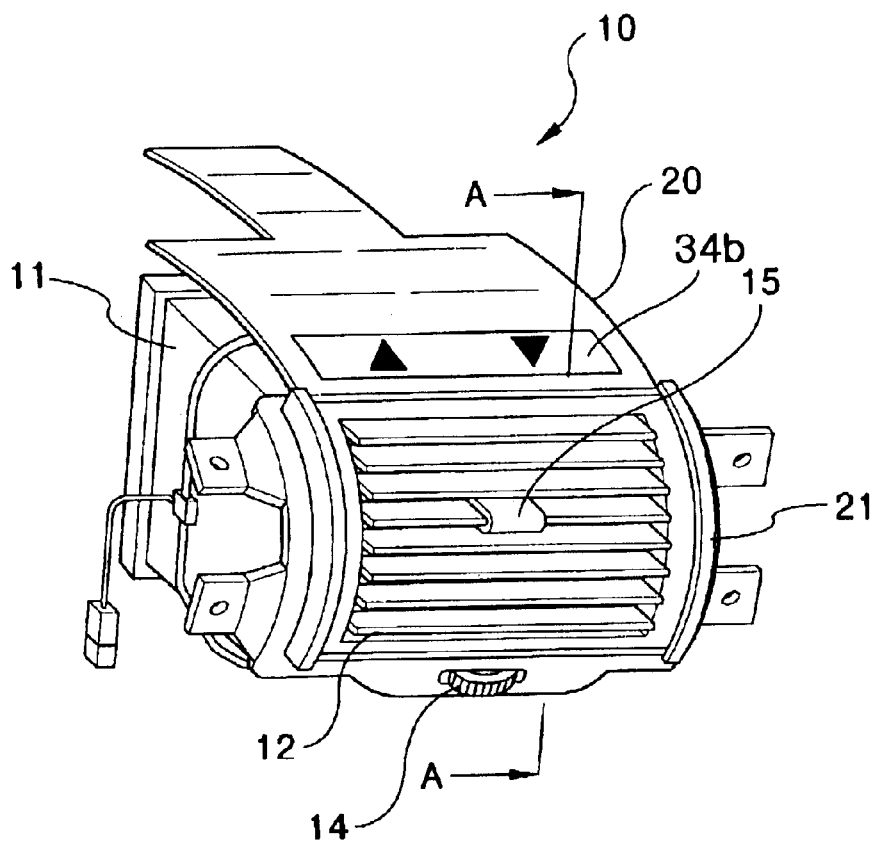

[FIG. 8]
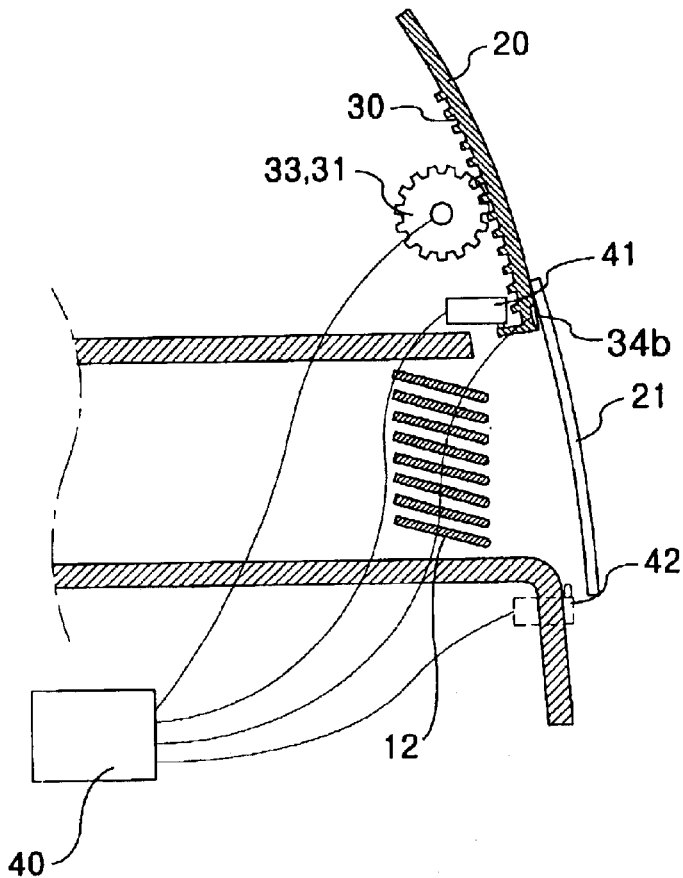
[FIG. 9]
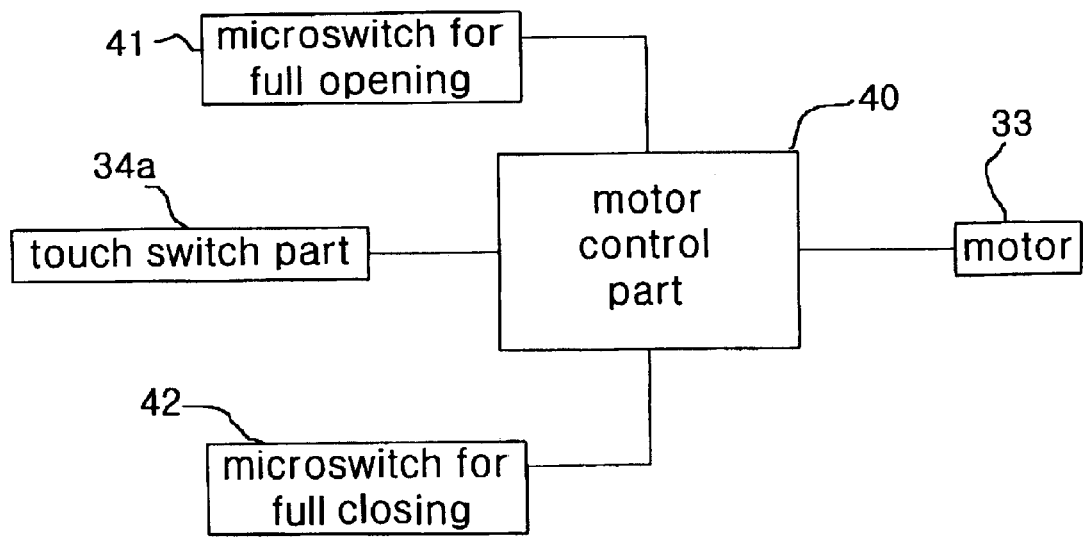

AIR VENT PROVIDED WITH A COVER

BACKGROUND OF THE INVENTION

1. Field of the Invention

The present invention relates to an air vent for inducing cold air or warm air generated in an HVAC (Heating Ventilating and Air Conditioning) apparatus to the interior in an automobile, and more particularly to an air vent provided with a cover which can be automatically open and closed.

2. Description of the Related Art

In general, for pleasant and comfort conditions inside automobiles, room temperature, lighting, humidity, sunbeams and contamination of air inside the room are controlled. Particularly, for control of room temperature inside an automobile, hot air heated by a heater in an air conditioner or cold air cooled by an air conditioner is supplied to the room of the automobile. Such hot air or cold air is distributed through ducts to parts of the automobile and supplied to the room of the automobile through an air vent. The air vent is typically equipped with a damper to control the ventilation flow rate and has a blade rotatably installed on a grill to control the direction of ventilation.

However, such air vents conventionally used have problems that foreign substances (mostly harmful to health) enter the inside of the air vent through gaps in the grill, thereby causing contamination of the inside of the ducts. Also, the external appearance of a crash panel on which the air vent is mounted is not favorable.

SUMMARY OF THE INVENTION

Therefore, the present invention has been made in view of the above problems, and it is an object of the present invention to provide an air vent including a duct for inducing air to the interior of an automobile and a grill disposed at the end of the duct, which comprises guides disposed at both sides of the grill; a cover equipped with a rack gear on its inner surface, which is lifted by the guides; a pinion gear engaged with the rack gear; a motor for rotating the pinion gear; and a switch part manipulated by a user to open and close the cover. The switch part can be a button switch disposed in front of the duct or a touch switch disposed at the lower part of the cover.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view showing the air vent provided with a cover according to the present invention which is applied to an automobile;

FIG. 2 is a perspective view of the air vent provided with a cover according to a first embodiment of the present invention, in which the cover is closed;

FIG. 3 is a perspective view of the air vent provided with a cover according to a first embodiment of the present invention, in which the cover is open;

FIG. 4 is a cross-section view along the line A—A in FIG. 4;

FIG. 5 is a block diagram of a circuit to drive a motor for opening and closing the cover according the first embodiment of the present invention;

FIG. 6 is a perspective view of the air vent provided with a cover according to a second embodiment of the present invention, in which the cover is closed;

FIG. 7 is a perspective view of the air vent provided with a cover according to a second embodiment of the present invention, in which the cover is open;

FIG. 8 is a cross-section view along the line A—A in FIG. 7; and

FIG. 9 is a block diagram of a circuit to drive a motor for opening and closing the cover according the first embodiment of the present invention.

DETAILED DESCRIPTION OF THE PREFERRED EMBODIMENT

Now, the present invention will be described in detail with reference to the accompanying drawings. Firstly, a first embodiment will be described.

As shown in FIG. 1, the air vent 10 according to the present invention is preferably mounted on an instrument panel of an automobile to supply air to the inside of the automobile.

As shown in FIG. 2 to FIG. 5, the air bent 10 includes a duct 11, a grill 12 (FIG. 3), a cover 20, a motor for opening and closing the cover 20 and a motor control part 40 (FIG. 4).

The duct 11 is connected to an HVAC apparatus (not shown) of the automobile and provides a pathway to supply cold air or hot air generated in the HVAC apparatus to the inside of the automobile. Since the grill 12 is disposed at the end of the duct 11, bulky foreign substances cannot come into the duct 11. The grill 12 can be rotated upward and downward by means of a knob 15, whereby direction of air can be controlled upward and downward. A dial 14 is connected to a damper (not shown) and its rotation determines the ventilation rate.

The cover 20 is engaged slidably with guides 21 disposed at both sides of grill 12. As the cover 20 is lifted, the duct 11 is open.

A rack gear 30 is disposed at the inner surface of the cover 20 and engaged with a pinion gear 31 (FIG. 4). The pinion gear 31 is connected to a shaft of the motor 33.

The motor 33 is preferably disposed over the duct 11 and since the pinion gear 31 is engaged with the rack gear 30, the cover can be open and closed by the rotation of the pinion gear 31 as the motor 33 turns.

The motor 33 can rotate clockwise or counterclockwise, or stop by actions of a button switch part 34a, a microswitch for full opening 41, a microswitch for full closing 42 and motor control part 40.

The button switch part 34a is preferably separated into a switch for clockwise rotation and a switch for counterclockwise rotation which are automatically returned. It is disposed at a part in front of the grill 12, that is, in front of the duct 11, and is connected to the motor control part 40. As the button switch part is turned on, the motor control part 40 is triggered to send a signal. By the signal from the motor control part 40, the motor 33 continuously rotates clockwise, whereby the cover 20 is opened, or the motor 33 continuously rotates counterclockwise, whereby the cover 20 is closed.

When the cover 20 is fully opened, the microswitch for full opening 41 is turned on by the cover 20, whereby the output of the motor control part 40 is reset, causing the motor 33 to stop. On the contrary, when the cover 20 is fully closed, the microswitch for full closing 42 is turned on the by cover, whereby the output of the motor control part 40 is reset, causing the motor to stop.

The motor control part 40 includes, for example, a relay for controlling the direction of rotation of the motor 33 and a flip-flop or timer for retaining the output signal. When the switch for clockwise rotation or counterclockwise rotation of the button switch part 34a is turned on, the motor control part 40 is triggered and continuously sends out a signal to the motor 33. Meanwhile, the microswitch for full opening 41 and the microswitch for full closing 42 are connected to the motor control part 40, for example a reset terminal of the flip-flap in the motor control part 40. Therefore, even when the motor control part 40 is operated by the button switch part 34a, the output of the motor control part 40 can be stopped preferentially by the action of the microswitch for full opening 41 and the microswitch for full closing 42.

Now, the effects of the present invention having construction as described above will be explained.

The closing of the cover 20 of the air vent 10 begins with a user's pushing of the button switch part 34a. Once the switch for counterclockwise rotation of the button switch part 34a is pushed, the motor control part 40 is triggered and sends out a signal of counterclockwise rotation. Even after the user takes off his finger from the button switch part 34a, the motor control part 40 continuously sends out the signal of counterclockwise rotation.

In accordance with the signal of counterclockwise rotation from the motor control part 40, the cover 20 is closed by the action of the pinion gear 31 and rack gear 30. When the cover 20 is fully closed, the microswitch for full closing 42 is turned on, whereby the motor control part 40 is reset, causing the motor 33 to stop.

The opening of the cover 20 of the air vent 10 is carried out by procedures similar to those for the closing of the cover. When a user pushes the button switch part 34a, switch for clockwise rotation of the button switch part 34a is turned on. Then, the motor control part 40 is triggered and sends out a signal of clockwise rotation.

In accordance with the signal of clockwise rotation from the motor control part 40, the cover 20 is open by the action of the pinion gear 31 and rack gear 30. When the cover 20 is fully open, the microswitch for full opening 41 is turned on, whereby the motor control part 40 is reset, causing the motor 33 to stop.

Now, a second embodiment of the present invention will be described in detail with reference to the accompanying drawings.

The construction of the second embodiment is the same with or similar to that of the first embodiment except that the switch part comprises a touch switch part 34b and disposed under the cover 20.

As shown in FIG. 1, the air vent 10 according to the second embodiment of the present invention is preferably mounted on an instrument panel of an automobile to supply air to the inside of the automobile.

As shown in FIG. 6 to FIG. 9, the air bent 10 includes a duct 11, a grill 12 (FIG. 8), a cover 20, a motor for opening and closing the cover 20 and a motor control part 40 (FIG. 8). Explanation of the construction of the second embodiment is focused on the matters different from that of the first embodiment.

The motor 33 can rotate clockwise or counterclockwise, or stop by actions of a touch switch part 34b, a microswitch for full opening 41, a microswitch for full closing 42 and motor control part 40.

The touch switch part 34b is preferably a capacitive touch switch commonly used in, for example, an elevator and is separated into a switch for clockwise rotation and a switch for counterclockwise rotation. It is disposed at the lower part of the cover 20 and is connected to the motor control part 40. By this structure, users can conveniently and readily recognize the switch. As the touch switch part 34b is turned on, the motor control part 40 is triggered to send a signal. By the signal from the motor control part 40, the motor 33 continuously rotates clockwise, whereby the cover 20 is opened, or the motor 33 continuously rotates counterclockwise, whereby the cover 20 is closed.

When the cover 20 is fully opened, the microswitch for full opening 41 is turned on by the cover 20, whereby the output of the motor control part 40 is reset, causing the motor 33 to stop. On the contrary, when the cover 20 is fully closed, the microswitch for full closing 42 is turned on the by cover, whereby the output of the motor control part 40 is reset, causing the motor to stop.

According to the present invention as described above, as the air vent is provided with a cover, small sized foreign substances are prevented from entering the duct of the HVAC apparatus in automobiles. Also, it is possible to provide a favorable appearance of a crash panel upon which the air vent of the present invention and is easy to design the exterior appearance of the panel. In addition, the cover of the air vent according to the present invention can be easily and conveniently open and closed.

What is claimed is:

1. An air vent with a cover including a duct for inducing air to the interior of an automobile and a grill disposed at the end of the duct, which comprises:

guides disposed at both sides of the grill;

a cover equipped with a rack gear on its inner surface, which is lifted by the guides;

a pinion gear engaged with the rack gear;

a motor for rotating the pinion gear;

a switch part manipulated by a user to open and close the cover;

a motor control part for continuously rotating clockwise or counterclockwise or stopping the motor according to a signal from the switch part;

a microswitch for full opening which is turned on when the cover is fully open and resets the motor control part, thereby causing the motor to stop; and a microswitch for full closing which is turned on when the cover is fully closed and resets the motor control part, thereby causing the motor to stop.

2. The air vent according to claim 1, wherein the switch part is a button switch disposed in front of the duct.

3. The air vent according to claim 1, wherein the switch part is a touch switch disposed at the lower part of the cover.

4. The air vent according to claim 1, wherein:

the pinion gear is connected to a shaft of the motor so that actuation of the pinion gear by the motor drives the cover to open and closed positions by rotation of the pinion gear as the motor turns.

* * * * *

UNITED STATES PATENT AND TRADEMARK OFFICE
CERTIFICATE OF CORRECTION

PATENT NO.      : 6,739,969 B2
DATED           : May 25, 2004
INVENTOR(S)     : K. Shin It is certified that error appears in the above-identified patent and that said Letters Patent is hereby corrected as shown below:

<u>Title page,</u>
Item [73], Assignee, "Yundai" should read -- Hyundai --.

Signed and Sealed this

Fifth Day of April, 2005

JON W. DUDAS
*Director of the United States Patent and Trademark Office*